United States Patent [19]

Stallard et al.

[11] Patent Number: 5,724,149
[45] Date of Patent: Mar. 3, 1998

[54] OPTICAL COMMUNICATION LINK FAULT SIGNALLING

[75] Inventors: William Andrew Stallard, Colchester; Andrew David Ellis, Suffolk; Robert Michael Percival, West Yorkshire, all of England

[73] Assignee: British Telecommunications plc, London, England

[21] Appl. No.: 956,008

[22] Filed: Dec. 3, 1992

[30] Foreign Application Priority Data

Apr. 20, 1990 [GB] United Kingdom ............... 9008895

[51] Int. Cl.$^6$ .................................................. H04B 10/02
[52] U.S. Cl. ......................... 359/110; 359/177; 359/179
[58] Field of Search ................................. 359/110, 117, 359/144, 174, 175, 176, 177, 179, 334; 385/24, 141

[56] References Cited

U.S. PATENT DOCUMENTS

| | | | |
|---|---|---|---|
| 4,257,033 | 3/1981 | Ota et al. | 359/117 |
| 4,435,849 | 3/1984 | Ilgner et al. | 359/177 |
| 4,457,581 | 7/1984 | Johnson et al. | 385/24 |
| 4,534,064 | 8/1985 | Giacometti et al. | 359/177 |
| 4,666,973 | 5/1987 | Mannschke | 359/177 |
| 4,918,396 | 4/1990 | Halemane et al. | 359/177 |
| 4,959,837 | 9/1990 | Février et al. | 385/141 |
| 4,963,832 | 10/1990 | Desurvire et al. | 385/141 |
| 4,995,100 | 2/1991 | Stallard et al. | 359/110 |
| 5,054,676 | 10/1991 | Grasso et al. | 359/174 |

FOREIGN PATENT DOCUMENTS

| | | | |
|---|---|---|---|
| 0010935 | 1/1987 | Japan | 359/144 |
| 0252230 | 1/1990 | Japan | 359/177 |
| 0119328 | 5/1990 | Japan | 359/177 |
| 4309929 | 11/1992 | Japan | 359/334 |
| 2245121 | 12/1991 | United Kingdom | 357/110 |

OTHER PUBLICATIONS

Grosskopf, Laser Amplifier in a Coherent Optical Fibre Transmission System, 1988.
Mahony, Developments in Optical Amplifier Technology and Systems, IEEE Apr. 1990.

*Primary Examiner*—Rafael Bacares
*Attorney, Agent, or Firm*—Nixon & Vanderhye, P.C.

[57] ABSTRACT

A fault signalling system for an optical fiber-based communications link having erbium doped fiber amplifier repeaters comprises a broadband optical source for generating a fault signal in the event of a fault occurring. Each repeater includes such a broadband source, which will output a characteristic fault signal onto the link for transmission to a receiving station, in the event of a fault being detected at that repeater. Advantageously, a control circuit which enables the source to emit its fault signal when appropriate is also used as part of an automatic gain control for the output of the amplifier repeater in normal operation.

28 Claims, 3 Drawing Sheets

OPTICAL COMMUNICATION LINK FAULT SIGNALLING

The present invention relates to a fault signalling system for a communications link. The invention is particularly applicable to a fault signalling system for an optical fibre communications link.

BACKGROUND

Optical fibre-based communication systems are used, with repeaters, to span considerable distances. Commonly, the cable between repeaters comprises protective claddings, tensile wire, a conductor and a bundle of optical fibres. The optical fibres typically carry light signals (but not necessarily in the visible spectrum). Each optical fibre has its own amplifier in a repeater. Electrical power is supplied to the amplifiers of each repeater by means of the conductor in each length of cable. Typically, a sub-sea communications link may be of the order of 5,000 km long, having a signal repeater roughly every 50 km to 100 km. In such a system it is desirable to be able to locate a fault on the link in a manner which avoids time-consuming and costly searching for the fault somewhere along the link.

Regenerative repeaters are known in which the incoming signal is detected and electronically processed before retransmission along the next length of fibre. More recently, optical amplifiers have been proposed for use in repeaters, such as photonic amplifiers, in which the incoming signal power is simply increased. This has the effect of accumulating degradations along a system of repeaters. However, they are potentially cheaper and, more importantly, may not require upgrading or other modification if the system as a whole is upgraded. Only the terminals require modification.

It has been proposed to use optical time domain reflectometry (OTDR) for fault location in a line. However, this is only possible on systems with no optically isolating components along the link. As a practical matter, it is thought that semi-conductor laser-based optically amplifying repeaters often will require such optically isolating components.

Techniques have also been proposed which, in the event of a fault, identify the furthest repeater along a link to receive a transmitted source signal. It is then possible to deduce that the fault causing a break in transmission has occurred between that further repeater receiving the signal satisfactorily and the next repeater in the link, which the signal does not reach.

In communications systems having semi-conductor laser amplifier repeaters, it has been proposed to arrange for a distress tone to be transmitted from the first repeater after a fault, ie. that repeater not receiving the relayed source signal, by monitoring the automatic gain control (AGC) of the semi-conductor laser and transmitting the distress tone when the AGC indicates that a transmitted source signal is not being received by that repeater. Each distress signal is designed to be characteristic of a particular repeater. Thus, all repeaters in the link not receiving the source signal will transmit a fault signal. These are analysed by the receiving station which is then able to identify by the characteristic tones which amplifier is the nearest to the fault.

A design factor in such a system is the dispersion which may occur in a link. The typical system mentioned above, being 5,000 km long, would give a dispersion of around 85 ns/nm (assuming a dispersion coefficient (d) of 17 ps/nm/km). This introduces a constraint with respect to the bandwidth available for the transmission of fault location information. (As will be clear, the full link length of 5,000 km must be considered since the distress tone from the repeater amplifier furthest from the receiving station will potentially be most affected by the dispersion and so it is this furthest repeater amplifier which must be considered when contemplating the successful transmission of a fault signal to the receiving station).

Dispersion can have different effects in different circumstances. Firstly, if the frequency F at which information is transmitted exceeds the natural spectral width of the transmitting source then the modulation bandwidth will give a dispersion limit. If it is assumed that the dispersion must be, for example, less than, say, 20% of the period of the frequency F, and that the spectral line width required to support the frequency F is of the order of 2F, then it can be shown that the frequency is limited to below about 380 MHz for the total number of distress frequencies transmissible on the link.

Conversely, if the transmission rate is less than the spectral width of the fault signal source then it is the dispersion of the source that limits the transmission frequency. For a 5 nm bandwidth transmission path this can be shown to give a limit of around 400 kHz.

Another factor which affects the bandwidth available to a fault signal is the bandwidth of the elements through which the signal will have to pass at each repeater, on its way to the receiving station. Although the elements at each repeater will generally be of the same type, in practice their characteristics are unlikely to be identical. For instance, if the signal must pass through an amplifier at each repeater, each amplifier may have a Gaussian pass bandwidth profile centered at substantially the same wavelength. However, the side portions of the Gaussian profile for each amplifier tend to vary slightly and this variation is compounded as a fault signal passes through a plurality of such amplifiers. The result is that the bandwidth of the plurality of amplifiers is significantly narrower than the bandwidth of one amplifier on its own.

SUMMARY OF THE DISCLOSURE

An object of the present invention is to provide an improved fault signalling system for a communications link, particularly where a fault signal must pass through a plurality of elements having similar but non-identical characteristics.

According to an aspect of the present invention, there is provided a fault signalling system for an optical communications link having a plurality of amplifiers, each amplifier having a gain profile for enhancing signals transmitted along the link, characterised in that each amplifier has associated with it signalling means having an output signal which is characteristic of that amplifier in said system, each output signal having a frequency bandwidth which is substantially wider than the collective gain profile of the plurality of amplifiers, and each signalling means being operable to transmit its output signal along the link to receiving means associated with the link, the output signal from at least one of said signalling means along the link being modified in the event of a fault so as to indicate the location of the fault.

The output signal or signals being so modified may simply be switched on or off in response to a fault.

Thus, in embodiments of the present invention, the design response in a situation where signals are to be transmitted by what is effectively a narrow bandwidth communications link with significant dispersion, is not to select a matching bandwidth for said signals but to select a broad bandwidth and exploit the narrow bandwidth of the link to reduce dispersion effects. This additionally overcomes a problem that might otherwise arise when the narrow effective bandwidth changes in time, for instance for environment reasons.

It may be that, in the event of a fault along the link, all the signalling means between the fault and receiving means associated with the link are enabled to transmit their respective output signals along the link. The amplifier closest to the fault would then be identified by the output signal of the signalling means furthest from the receiving means. For instance, in such an arrangement each amplifier may have associated with it fault detection means for detecting a fault condition in the link, the signalling means associated with the same amplifier then responding to an enabling signal from the fault detection means to transmit its output signal along the link whenever a fault occurs between a signal source to the link and the relevant amplifier. In this arrangement, all the amplifiers lying between the fault and the receiving means associated with the link will be identified by "distress calls" from their associated signalling means, but none of the amplifiers prior to the fault along the link will be so identified.

In a variation of the above arrangement, the distress call from each amplifier may have the effect of suppressing or cancelling the distress calls of subsequent amplifiers along the link. This reduces traffic on the link, improving the available power budget, and makes the amplifier which is closest to a fault very easy to identify. For instance, a distress call might "mimic" the normal signal channel on the link.

In a further alternative arrangement, all the signalling means for each of the amplifiers might be arranged to transmit their output signals along the link under normal conditions. If a fault occurs, the output signals of signalling means prior to the fault along the link will be blocked by the fault. The first amplifier after the fault and on the same side as the receiving means can then be identified from the remaining output signals transmitted to the receiving means. This option however has the potential disadvantage of increasing the traffic normally carried by the link. An advantage, on the other hand, is that such a system is "fail-safe" in that failure of the signalling means associated with any amplifier can be immediately detected.

According to another aspect of the invention there is provided an amplifying arrangement for an optical communications link provided with a plurality of such arrangements, said arrangement comprising amplifying means and fault signalling means, the fault signalling means being operable to transmit an output signal onto the link, which output signal identifies that amplifying arrangement, said output signal having an output frequency bandwidth which is substantially wider than the collective gain bandwidth of the plurality of amplifying arrangements with respect to signals transmitted on the link.

A particularly effective and relatively cheap broadband fault signalling means which might be used in embodiments of the invention is a light emitting diode.

The bandwidth of a repeater can be defined in different ways. Commonly, it is taken as the bandwidth at which the spectral gain falls by 3 dB.

The gain profile of each repeater might be narrower than the output of each broadband fault signalling means associated with the repeaters of the link. In this way, only a portion of the broadband output of the fault signalling means will be transmitted along the link and thus a fault signal can be substantially "fitted" to the wavelength band of the link. Furthermore, the output of each subsequent repeater will generally narrow slightly further the spectral slice transmitted. It is thus possible to limit the effects of dispersion by effectively filtering the output of each fault signalling means, reducing its bandwidth. The consequent spectral shaping is carried out by each repeater through which the signal passes, so the effective optical bandwidth of the fault signal is given by the collective gain bandwidth of all the repeaters through which the associated fault signal passes.

The diode or any other fault signalling means may conveniently communicate with the communications link by means of an asymmetric coupler.

The present invention is particularly applicable to links including repeaters in which the signal waveform is not processed, other than to increase its optical power, such as by an optically-based or photonic amplifier. An example uses rare earth ions, for example, erbium doped fibre amplifier (EDFA) repeaters. However, the system is also applicable to links employing other forms of repeater or as an alternative, or supplement, to OTDR.

Each repeater, amplifier, or amplifying means of a series may be provided with fault detection means such as a photodiode arranged to produce the fault-indicating output signal, or "distress call", only when a fault is detected in the output of that repeater or amplifying means. If the normal signal channel of the optical communications link is broken, the input to the repeater will be faulty in some manner such as being absent. In this event the output of the repeater will also be faulty and therefore trigger a "distress call". For instance, the normal signal channel might be identified by a superimposed 20 KHz ripple. If the 20 KHz ripple cannot be picked up at a repeater, a distress call from that repeater will be triggered. The fault detection means may for instance be sensitive specifically to the sensed output power of the repeater.

Each repeater, commonly incorporates automatic gain control means to maintain the gain parameters of the link. Such control means are generally operable, in the response to the detected output of an amplifier in the repeater, to maintain the output of the repeater, under normal circumstances, substantially at a predetermined level. In this case the gain control means may also usefully be used to enable the signalling means of the repeater to output a distress call when a fault is indicated by said detected output.

As indicated above, in order that the various repeaters can be individually identified it is preferable that the fault signalling means generate a fault signal which is characteristic of its repeater. This will allow it to be identified by the receiving station. Thus, the fault signal may be constituted by a modulated broadband output from, for example, the light emitting diode in an optical fibre-based system.

DESCRIPTION OF THE DRAWING

The present invention can be put into practice in various ways one of which will now be described by way of example with reference to the accompanying drawings in which.

DESCRIPTION OF THE PREFERRED EMBODIMENT

Figure 1:
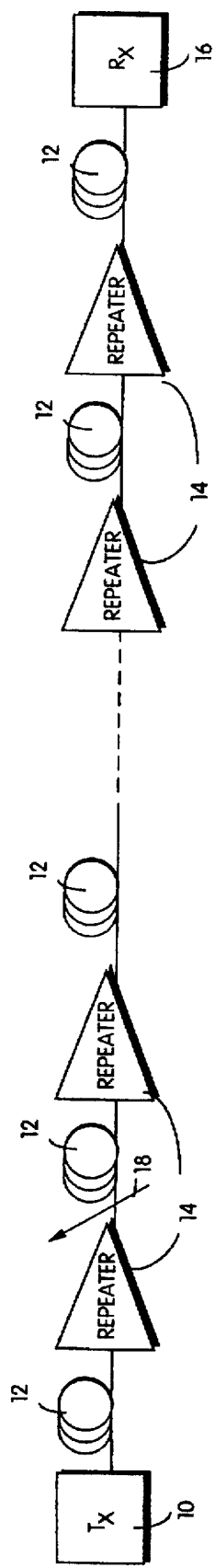
FIG. 1 illustrates schematically an optical fibre-based communications link.

Referring to FIG. 1, a typical sub-sea optical fibre communications link comprises a transmitter 10, a number of lengths of submarine cable which comprises a plurality, eg. 6 or 8, of step-index optical fibres 12 and repeaters 14 between the lengths of cable which are used to boost the signal. The cable also includes an electrical conductor (not shown) for supplying electrical power to the repeaters. The total link length may be 5,000 km or more.

It should be noted that submarine cables operate in both directions. This can be achieved by duplex operation of each fibre but, in the usual arrangement, one half of the fibres is used for transmission in one direction and the other half is used for transmission in the reverse direction. A high positive voltage is applied at one end of the system and a high negative voltage at the other end of the system. The overall effect is that electrical power is supplied from both ends. Even in the event of a complete severance of the cable at least one end portion usually remains sufficiently operative for the transmission of the distress signals. In such a system there may be 100 or more repeaters. The transmitted source signal is sent via the link to a receiving station 16.

The arrow 18 in FIG. 1 denotes a break or other fault in the link. This break will cause the repeaters 14 between the break and the receiving station 16 to generate distress signals. Each distress signal is characteristic of its repeater. This allows the receiving station 16 to determine the repeater which is closest to the break.

Figure 2:
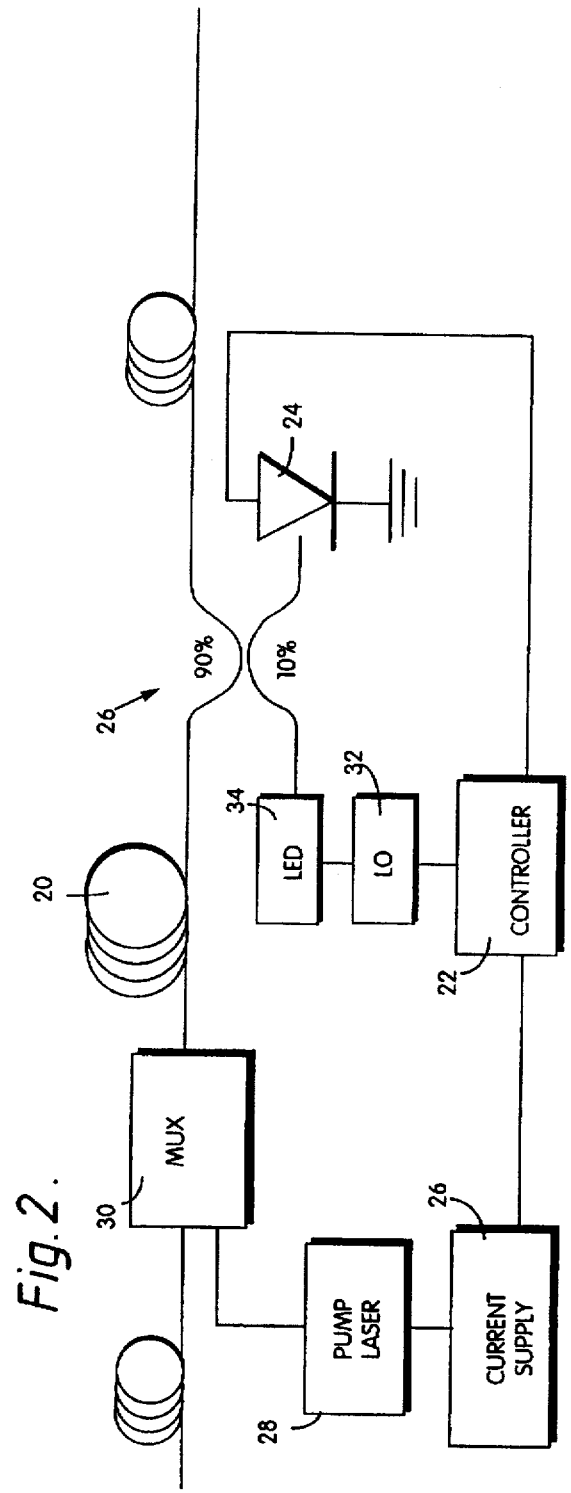
FIG. 2 illustrates schematically a fault signalling system according to the invention.

Turning now to FIG. 2, one of the repeaters 14 is shown in more detail. The repeater amplifier is a photonic amplifier, for example, erbium doped fibre amplifier (EDFA) 20. The output of the EDFA is monitored by an automatic gain control circuit comprising a controller 22 which receives a signal from a photodiode 24 which signal is related to the output from the EDFA. The photodiode 24 receives a proportion of the output signal from the EDFA by means of a four arm asymmetric coupler 26. In response to the signal from the photodiode 24, the controller 22 controls the output of a current supply 26 which feeds a 1480 nm MQW (multi-quantum well) laser 28 or other high power pump laser. The output of the laser 28 is applied to the EDFA by means of a wavelength division multiplex device 30, and has the effect of altering the gain of the EDFA without generally being transmitted any further on the link. Thus if the output of the EDFA tends to fall or rise the trend is counteracted by the automatic gain control circuit which therefore controls the repeater gain by maintaining a substantially constant output from the EDFA.

Because the controller 22 is arranged to monitor the output of the EDFA, in order to maintain that output substantially constant, it can also use that monitored output to detect any fault on the output in the nature of a substantial reduction or complete loss of signal transmitted to that repeater from the source. In the event that the controller 22 determines that a fault situation has occurred between the transmitter and the repeater, for instance because saturation has occurred within the automatic gain control circuit, it enables a light emitting diode (LED) 34 and a local oscillator 32 which modulates the output of the LED 34, the output of the LED 34, in the form of a broadband carrier signal, is modulated by the local oscillator with a characteristic tone particular to that repeater.

To avoid the distress call appearing to the controller 22, and to subsequent repeaters in the link, as a normal signal and therefore cancelling itself, the controller 22 is able to recognise the difference between a normal signal travelling along the link and the distress signal on the output of the amplifier because the two signals are of substantially different frequencies. For instance, the controller may be unable to detect the presence of the distress signal. It will then maintain the fault condition until the fault is corrected. The gain determined by the automatic gain control circuit immediately prior to the fault is maintained during the fault condition. When the fault has been corrected the controller will once again detect a normal signal and, therefore, it will disable the LED 34 and the local oscillator 32.

The LED 34 is connected to the remaining fourth arm of the asymmetric coupler 26 to transmit its characteristic output along the remainder of the optical fibre link. The LED 34 may alternatively be connected at the input to the EDFA to transmit its signal, as amplified by the EDFA, along the link.

In order to detect the optically transmitted fault signal, it is important to maintain an appropriate power budget for each repeater fault transmission. In other words, the fault signal should be compatible with the normal operating gain profile of each EDFA similarly to the normally transmitted signal from the transmitter source, otherwise it will not be optimally enhanced at each repeater and will be too weak to detect at the receiving station. This imposes two requirements on the system. Firstly, the pump power of each EDFA must be correctly set, for instance to its value before the fault occurred, in order that the EDFA may be activated sufficiently to enhance the fault signal optimally. Secondly, some part of the fault signal spectrum must be within the pass-band of all the EDFAs in the link. In this regard, the main requirement is that the fault signal will experience gain (ie. signal enhancement) at each repeater through which it passes to overcome the inherent system losses, otherwise the signal at the receiver may be too weak to detect.

A separate laser, for example a distributed feedback (DFB) laser, of the correct wavelength could be used to transmit the fault signal. This would give about 300 MHz of bandwidth. However, it is then important to match the DFB laser wavelength very carefully to that of the EDFA gain peak. This is considered to involve significant disadvantages as the output frequency of the separate DFB laser is critical. Manufacture of DFB lasers having output bandwidths according to acceptably close tolerances would be expensive. Furthermore, laser diodes are prone to temperature variations in service, leading to wavelength fluctuations of about 1 Angstrom per °C. Thus, for a system with an overall pass-band of 0.4 nm this variation can be quite significant. A typical DFB laser has a bandwidth of less than 0.1 nm. The problem is that the drift of wavelength with temperature may take the DFB laser output out of the overall pass-band of the cascade of amplifiers in the link. Therefore, if such a DFB laser device were to be used a very sophisticated temperature control arrangement would also be needed which would render them even more costly to manufacture and, possibly, more prone to breakdown.

Alternatively, the fault signal could be carried by the spontaneous emission of the EDFA. The advantages of this technique include a simple construction having a low component count and an automatic alignment of the fault signal wavelength to the optimum system gain as dictated by the gain profile of the repeaters. In practice the semi-conductor pump laser 28 could be modulated by the local oscillator, thus modulating the gain and the spontaneous output of the EDFA. However, it is considered that erbium based devices cannot be modulated sufficiently quickly. Thus, the potential modulation bandwidth across which the characteristic repeater tones can be spread is significantly restricted. Furthermore, low speed transmission rates in optical fibres give rise to the risk of crosstalk especially within the amplifying means which is only negligible for modulation frequencies above 10 kHz.

The preferred technique illustrated in FIG. 2 uses the separate light emitting diode (LED) with emission over about 50 nm spectral bandwidth. Clearly, a 50 nm source such as this would suffer considerable dispersion in an optical fibre. This limits modulation frequencies to less than 40 kHz in the cited link. However, in this regard the gain profile of the EDFA is of assistance.

Figure 3A:
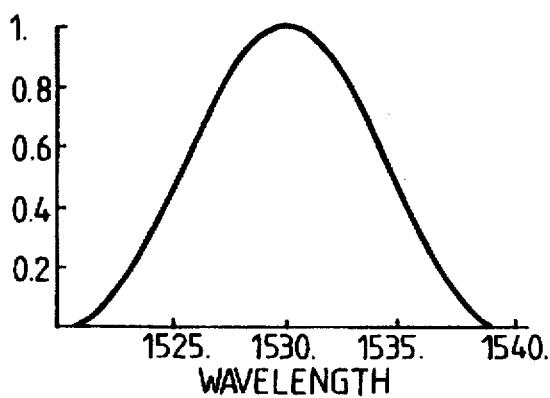
FIGS. 3a), b) and c) are graphs illustrating the spectral shaping of the fault signal by repeaters.
Figure 3B:
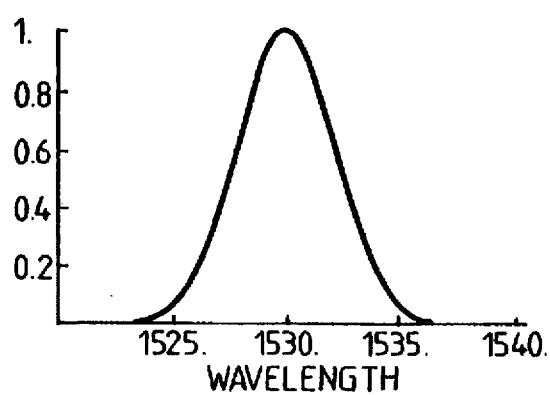
Figure 3C:
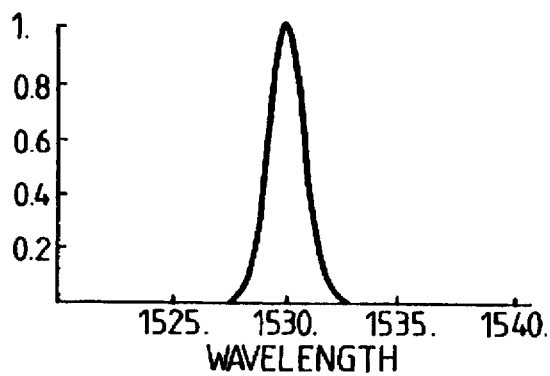

Referring to FIGS. 3a, b) and c) the LED output spectrum over the 1520 nm to 1540 nm wavelengths is illustrated in FIG. 3a). The gain profile of the EDFA over the same spectral width is Gaussian. This gain profile modifies the LED output by attenuating wavelengths outside the profile and modifying The shape of the LED output as shown in FIG. 3b). Only those wavelengths from the LED which match the central portion of the gain profile of the EDFA will be subject to significant gain. Thus the spectral output of the LED will be effectively filtered by the first EDFA through which it passes, and to a lesser extent by each subsequent EDFA, thus reducing its bandwidth. The effective optical bandwidth of each LED at the receiving station is thus given by the collective gain bandwidth of the set of EDFAs between it and the receiving station. This is illustrated in FIG. 3c) in which the original LED spectrum has been modified by ten EDFA's.

For 100 EDFAs, each with a 4 nm gain bandwidth profile which is Gaussian in shape, there is an effective overall bandwidth, as seen by a repeater whose distress call must pass through all 100 EDFAs, of 0.4 nm due to the cumulative decline in the relative power of wavelengths away from the amplifier gain peaks, giving a dispersion limit on the transmitted fault frequency spectrum of 4 MHz for the characteristic fault tones.

Figure 4:
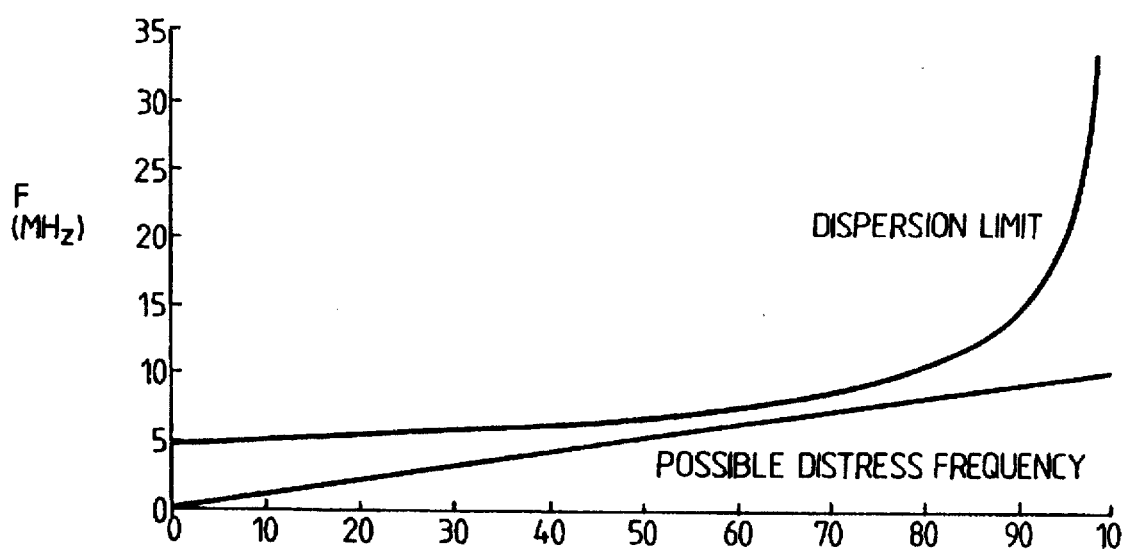
FIG. 4 is a graph illustrating the possible fault signal frequencies available in a system according to the invention.

For amplifiers closer to the system receiving terminal, less bandwidth reduction would occur. This tends to increase the dispersion, but the reduction in fibre length more than compensates for this drawback, giving a net reduction in dispersion. This is illustrated in FIG. 4 in which the maximum transmission frequency (F) for each amplifier along the link is plotted in comparison to a possible distribution of fault frequencies. As illustrated, there is a fault frequency spacing of 0.1 MHz, with a minimum frequency which is within the normal passband of the system receiver.

Of course, it is important to be able to detect the information that has been transmitted by the repeaters. Under normal circumstances, the system receiver could be used. However, if a broadband source is used which is limited to a few hundred kHz by, say, dispersion, then the low frequency cutoff of the receiver may reject the fault signal information. It is thus preferable to use a dedicated low frequency receiver for analysis of the fault information. Furthermore, it is advantageous if the low frequency receiver derives its information from a power splitter to provide continuous fault monitoring.

The fault signalling system according to the present invention can be used on extremely long EDFA repeater based links by using a broadband LED. The automatic gain control is used to maintain a constant gain and to detect any fault. The LED can be modulated between, for example, 100 kHz and 10 MHz to transmit fault information from each amplifier. The lower limit is set by crosstalk in the following amplifiers, and the upper limit by dispersion over the step index fibre. Importantly, the LED spectrum is modified by the gain profile of the EDFAs, ensuring the transmission of the signal through the system. The technique according to embodiments of this invention can thus address all of the problems associated with EDFA fault signalling, namely modulation, transmission and detection of the signal.

We claim:

1. A fault signalling system for a long range optical communications link over which narrow bandwidth signals are transmitted comprising:
   a plurality of photonic amplifiers, each photonic amplifier having a gain profile for enhancing signals transmitted along the link;
   a broadband signalling means associated with each photonic amplifier and coupled to the link for coupling an optical output signal characteristic of the particular photonic amplifier onto the communications link;
   each said optical output signal having a frequency bandwidth which is substantially wider than the collective gain bandwidth profile of the plurality of photonic amplifiers;
   each said signalling means being operable to transmit its characteristic optical output signal along the communications link to receiving means associated with the link; and
   means for generating or interrupting the characteristic output signal from at least one of said signalling means in the event of a fault so as to provide an indication at the receiving means of the location of the fault.

2. A system as claimed in claim 1 wherein said plurality of photonic amplifiers comprise erbium doped fibre amplifiers.

3. A system according to claim 1 in which the communications link comprises optical fibres.

4. A system as claimed in claim 3 in which the signalling means comprise a broadband light emitting diode.

5. A system as claimed in claim 1 comprising modulating means which modulate the output of the signalling means to produce a fault signal characteristic of the associated amplifier.

6. A system as claimed in claim 5 in which the modulating means comprise an oscillator arranged to modulate the output of the signalling means with the signal characteristic of the associated photonic amplifier.

7. A system as claimed in claim 1 in which the signalling means are coupled to the communications link by an asymmetric coupler.

8. A system as claimed in claim 1 in which each photonic amplifier comprises an optical fibre doped with a rare earth ion.

9. A system as claimed in claim 1 wherein each photonic amplifier is comprised by a repeater in the optical communication link, each repeater also comprising fault detection means arranged to produce an output signal related to the output power of the repeater and used to determine a fault condition.

10. A system as claimed in claim 9 in which the fault detection means comprise a photodiode.

11. A system as claimed in claim 1 wherein, in the event of a fault, an output signal is triggered from the signalling means associated with the photonic amplifier adjacent the fault, on the side of the fault towards said receiving means.

12. A system as claimed in claim 11 wherein, in the event of a fault, an output signal is triggered from the signalling means associated with each photonic amplifier positioned along the link between the fault and said receiving means.

13. A system as claimed in claims 11 wherein, in the event of a fault, an output signal is suppressed from the signalling means associated with each photonic amplifier positioned along the link between the fault and said receiving means, except the amplifier immediately adjacent the fault.

14. An amplifying arrangement for an optical communications link provided with a plurality of such arrangements, said arrangement comprising photonic amplifying means for amplifying signals transmitted along the link and fault signalling means for signalling a fault condition detected at the amplifying arrangement, the fault signalling means being operably coupled to the communications link to transmit an output signal onto the link, which output signal identifies that amplifying arrangement, said output signal having an output frequency bandwidth which is substantially wider than the collective gain bandwidth of the plurality of amplifying arrangements and with respect to normal narrow bandwidth signals transmitted on the link.

15. An amplifying arrangement according to claim 14 wherein said photonic amplifying means comprises an erbium doped fibre amplifier.

16. An amplifying arrangement according to claim 14, further comprising fault detection means operable, in response to a fault condition in a communications signal received by the amplifying arrangement, to control or modify the output signal of the fault signalling means.

17. An amplifying arrangement according to any one of claims 14, 15 or 16 wherein said fault signalling means comprises a broadband light emitting diode.

18. An amplifying arrangement as claimed in claim 14, wherein the fault signalling means comprises modulating means arranged to modulate the output signal of the signalling means in a manner characteristic of the amplifying arrangement.

19. An amplifying arrangement as claimed in claim 18 in which the modulating means comprises an oscillator.

20. An amplifying arrangement according to claim 14 in which the fault signalling means is coupled the output of the amplifying arrangement by means of an asymmetric coupler.

21. Am amplifying arrangement as claimed in claim 14 wherein the amplifying means comprises a fibre doped with a rare earth ion.

22. An amplifying arrangement as claimed in claim 16 wherein the fault detection means comprises a photodiode.

23. An amplifying arrangement as claimed in claim 14 including automatic gain control means operable, in response to changes in the output of the amplifying means, to control the output of the amplifying arrangement substantially at a predetermined level.

24. An amplifying arrangement as claimed in claim 22 in which the photodiode is operably connected with the output of the amplifying means by means of an asymmetric coupler.

25. An amplifying arrangement as claimed in claim 23 wherein the automatic gain control means are further operable to enable the fault signalling means, in response to an output of fault detection means indicative of a reduction in the output of the photonic amplifying means below a predetermined level.

26. An amplifying arrangement as in claim 14 wherein each amplifier arrangement is comprised by a repeater, each repeater comprising fault detection means arranged to provide a signal related to the output power of the repeater.

27. A telecommunication link comprising a plurality of repeaters as claimed in claim 26 operably connected between lengths of optical fibre cable, the repeaters having inputs and/or outputs of the associated amplifying arrangements connected to a corresponding plurality of the lengths of the cable.

28. A link as claimed in claim 27 in which the amplifying arrangements in the repeaters have substantially the same gain bandwidth.

* * * * *